(12) United States Patent
Lim (10) Patent No.: US 11,552,491 B2
(45) Date of Patent: Jan. 10, 2023

(54) CHARGING MANAGEMENT SYSTEM AND METHOD FOR BATTERIES

(71) Applicant: UVIFY CO., LTD., Seoul (KR)

(72) Inventor: Hyon Lim, Seoul (KR)

(73) Assignee: UVIFY CO., LTD., Seoul (KR)

( * ) Notice: Subject to any disclaimer, the term of this patent is extended or adjusted under 35 U.S.C. 154(b) by 295 days.

(21) Appl. No.: 16/800,243

(22) Filed: Feb. 25, 2020

(65) Prior Publication Data

US 2021/0242704 A1     Aug. 5, 2021

(30) Foreign Application Priority Data

Feb. 5, 2020 (KR) ........................ 10-2020-0013428

(51) Int. Cl.
*H02J 7/00* (2006.01)
*B60L 50/64* (2019.01)

(52) U.S. Cl.
CPC ............ *H02J 7/0071* (2020.01); *B60L 50/64* (2019.02); *H02J 7/005* (2020.01); *H02J 7/0013* (2013.01); *H02J 7/00032* (2020.01); *H02J 7/0045* (2013.01); *H02J 7/0048* (2020.01); *B60L 2200/10* (2013.01)

(58) Field of Classification Search
CPC .. H02J 7/0003; H02J 7/00034; H02J 7/00036; H02J 7/00047; H02J 7/342; H02J 7/0071; H02J 7/00032; H02J 7/0048; H02J 7/005; H02J 7/0013; H02J 7/0045; B60L 50/64; B60L 2200/10; B60L 53/00; B60L 53/50; B60L 53/51; B60L 53/52; B60L 53/53; B60L 53/54; B60L 53/55; B60L 53/56; B60L 53/57; B60L 53/67;
(Continued)

(56) References Cited

U.S. PATENT DOCUMENTS

2004/0130292 A1    7/2004   Buchanan et al.
2010/0280678 A1*   11/2010   Tate, Jr. ................ B60L 53/67
                                                             700/297
(Continued)

FOREIGN PATENT DOCUMENTS

EP           0314155 A2    5/1989
KR         101704359 B1    2/2017
(Continued)

*Primary Examiner* — Samuel Berhanu
(74) *Attorney, Agent, or Firm* — Dinsmore & Shohl LLP; Yongsok Choi, Esq.

(57) ABSTRACT

A battery charging management system includes a plurality of sockets combinable with a plurality of devices onto which a plurality of battery packs are mounted; a binding controller configured to receive state information of the plurality of battery packs from the plurality of devices, determine a priority of the plurality of devices to be allocated to the plurality of sockets according to a charging strategy selected based on the state information, and allocate one of the plurality of sockets to one of the plurality of devices or releasing the allocating; a charging controller configured to control charging of the plurality of battery packs of the plurality of devices electrically connected to a charging circuit based on the state information received by the binding controller; and a distributor configured to switch an electrical connection between the charging circuit and the plurality of battery packs.

19 Claims, 5 Drawing Sheets

(58) Field of Classification Search
CPC .......... B60L 53/68; B60L 53/10; B60L 53/62; B60L 53/66
USPC .......................................... 320/104, 109, 112
See application file for complete search history.

(56) References Cited

U.S. PATENT DOCUMENTS

| | | | |
|---|---|---|---|
| 2010/0295503 A1 | 11/2010 | Bourilkov et al. | |
| 2011/0140659 A1* | 6/2011 | Suzuki | B60L 53/67 320/109 |
| 2012/0277927 A1* | 11/2012 | Watkins | B60L 53/14 700/292 |
| 2014/0266046 A1* | 9/2014 | Baxter | H02J 7/007 320/109 |
| 2015/0165917 A1 | 6/2015 | Robers et al. | |
| 2015/0280466 A1* | 10/2015 | Owen | B60L 1/06 320/107 |
| 2015/0346698 A1* | 12/2015 | Mailloux | B60L 53/63 307/31 |
| 2019/0100108 A1* | 4/2019 | Davis | H02J 7/0042 |

FOREIGN PATENT DOCUMENTS

| | | | | |
|---|---|---|---|---|
| WO | 2011134861 A1 | 11/2011 | | |
| WO | WO-2011151696 A2 * | 12/2011 | ................ | B60L 3/12 |
| WO | 2017217929 A1 | 12/2017 | | |
| WO | WO-2019232625 A1 * | 12/2019 | ............. | B60L 53/11 |
| WO | 2020011884 A1 | 1/2020 | | |

\* cited by examiner

CHARGING MANAGEMENT SYSTEM AND METHOD FOR BATTERIES

CROSS-REFERENCE TO RELATED APPLICATION

This application claims priority to Korean Patent Application No. 10-2020-0013428 filed on Feb. 5, 2020, the entire contents of which are herein incorporated by reference.

TECHNICAL FIELD

The present disclosure relates to a battery charging management system and a battery charging management method. More specifically, the present disclosure relates to a battery charging management system and a battery charging management method for efficiently charging a plurality of batteries according to a charging strategy intended by a user in charging the plurality of battery.

BACKGROUND ART

As the capacity efficiency to weight of batteries improves with the technology development, electric mobility systems using batteries such as drones, electric scooters, electric bicycles, and electric vehicles have become popular. Accordingly, there is a growing demand for efficiently managing and charging batteries on a large scale. However, charging batteries on a large scale has a problem in that a demand prediction is difficult in terms of a power supply chain.

The method of charging a mobility system according to the related art is a method in which an individual directly charges his/her mobility system. However, with the emergence of businesses that run mobility systems on a large scale, such as electric kickboard rental services or drone rental services, and the popularity of electric vehicles, there is a need for a method of efficiently charging and managing a large number of batteries.

In the case of a mobility system using fossil fuel as a power source, for example, an internal combustion transporter, according to the related art, a fuel charging time is a fuel injection time, which is very fast. However, the charging time of an electric mobility system powered by electricity is a battery charging time, which is very slow.

A traditional fuel charging method of fully charging fuel in the mobility system (including a fossil fuel transporter or a motorized transporter) in the order a fuel charger is occupied is not suitable for charging batteries in a large number of mobility systems and is inefficient.

Generally, a charger charges a battery in the order of a fixed current mode and a fixed voltage mode. In the fixed current mode, the charger supplies the maximum current at a constant current in proportion to the battery capacity, while in the fixed voltage mode, because the battery is almost saturated to the charge limit voltage, the charger rapidly reduces and supplies the charging current. When the charger is in the fixed voltage mode, because the power consumption of the charger is drastically reduced, there may be enough power to charge an additional battery. Therefore, there is a problem that additional charging of the battery using the power reduction pattern of the charger may not be performed without an appropriate charging management system.

In addition, collection of information of the existing battery uses wired communication. If all wired communication lines are connected to a central control unit to collect information of a plurality of batteries in the center, wiring becomes very complicated, the system cost increases, and maintenance becomes difficult. In the case of a main power supply line, the infrastructure is indispensable, but if a signal line is wired, the complexity greatly increases.

PRIOR ART DOCUMENT

Patent Document (Patent Document 0001) KR 10-1704359 B1 (Feb. 1, 2017)

SUMMARY

Provided are a battery charging management system and a battery charging management method capable of efficiently charging and managing a plurality of batteries in a limited power environment according to the charging strategy required by a user.

Provided also are a battery charging management system and a battery charging management method capable of charging and managing a large number of batteries in a situation where the large number of batteries are charged without intervention of human.

Provided also are a battery charging management system and a battery charging management method capable of stably performing charging a battery by limiting charging when a charging request exceeds the power load in charging the battery and preventing fire and accident that may occur in a supply network chain.

The technical problems of the present disclosure are not limited to the above-mentioned technical problems, and other technical problems not mentioned will be clearly understood by those skilled in the art from the following description.

Solution to Problem

According to an aspect of the present disclosure, a battery charging management system with respect to a plurality of battery packs includes a plurality of sockets combinable with a plurality of devices onto which the plurality of battery packs are mounted; a binding controller configured to receive state information of the plurality of battery packs from the plurality of devices onto which the plurality of battery packs are mounted, determine a priority of the plurality of devices to be allocated to the plurality of sockets according to a charging strategy selected based on the state information, and allocate one of the plurality of sockets to one of the plurality of devices or releasing the allocating; a charging controller configured to control charging of the plurality of battery packs of the plurality of devices electrically connected to a charging circuit based on the state information received by the binding controller; and a distributor configured to switch an electrical connection between the charging circuit and the plurality of battery packs of the plurality of devices under control of the charging controller.

The binding controller may be configured to generate a control signal such that the battery charge management system generates a visual or audio signal or generate a control signal for controlling a robot that binds the plurality of devices to the plurality of sockets when allocating the plurality of sockets or releasing the allocating.

The charging strategy may be to charge the plurality of battery packs of the plurality of devices in descending order of state of charge (SoC) values.

The distributor may be configured to switch an electrical connection such that a battery pack of a next order is charged according to the charging strategy among the plurality of battery packs of the plurality of devices if a charging power of a charging circuit is smaller than a maximum use power.

The charging strategy may be to charge the plurality of battery packs of the plurality of devices in ascending order of SoC values.

The distributor may be configured to switch an electrical connection such that a battery pack of a next order is charged according to the charging strategy among the plurality of battery packs of the plurality of devices if a charging power of a charging circuit is smaller than a maximum use power.

The state information of the plurality of battery packs may include one or more pieces of information among state of charge (SoC) information, state of health (SoH) information, current voltage information of the plurality of battery packs, charging current information of the plurality of battery packs, and discharge current information of the plurality of battery packs, which are collected from the plurality of battery packs by a battery management system (BMS) mounted onto the plurality of battery packs.

The binding controller may be configured to receive the state information from the plurality of devices using a wireless communication module.

The binding controller may be configured to determine the priority for a device that enters a charging standby mode among the plurality of devices.

The, if there are sockets that are not connected to the plurality of devices among the plurality of sockets, and a current use power of the charging circuit is within a maximum use power, binding controller may be configured to allocate one of the sockets that are not connected to the plurality of devices to the device that enters the charging standby mode.

The charging controller may be configured to limit the charging power such that the charging power of the charging circuit does not exceed a maximum use power.

The plurality of devices may be one of the plurality of battery packs onto which a BMS is mounted, unmanned aerial vehicles (UAVs), and electrically driven mobilities.

According to an aspect of the present disclosure, a battery charging management method performed by a computing device with respect to a plurality of battery packs includes receiving state information of a plurality of battery packs from a plurality of devices onto which the plurality of battery packs are mounted; determining a priority of the plurality of devices to allocate the plurality of sockets according to a charging strategy selected based on the state information; allocating the plurality of sockets to the plurality of devices according to the priority; controlling charging of the plurality of battery packs according to the charging strategy if the plurality of sockets are electrically connected to the plurality of devices; and releasing the allocating of the plurality of sockets if the charging is completed.

The charging strategy may charge the plurality of battery packs of the plurality of devices in ascending order of state of charge (SoC) values.

An electrical connection may be switched such that a battery pack of a next order is charged according to the charging strategy among the plurality of battery packs of the plurality of devices if a charging power of a charging circuit is smaller than maximum use power.

The charging strategy may charge the plurality of battery packs of the plurality of devices in descending order of SoC values.

An electrical connection may be switched such that a battery pack of a next order is charged according to the charging strategy among the plurality of battery packs of the plurality of devices if a charging power of a charging circuit is smaller than a maximum use power.

The state information of the plurality of battery packs may include one or more information among state of charge (SoC) information, state of health (SoH), current voltage information of the plurality of battery packs, charging current information of the plurality of battery packs, and discharge current information of the plurality of battery packs that are collected from the plurality of battery packs by a battery management system (BMS) mounted onto the plurality of battery packs.

The state information may be received from the plurality of devices using a wireless communication module, and the priority may be determined for a device that enters a charging standby mode among the plurality of devices.

According to an aspect of the present disclosure, a battery charging management method performed by a computing device with respect to a plurality of battery packs includes searching for a device that enters a charging standby mode; if the device that enters the charging standby mode is found, determining whether there is an available socket; if there is the available socket, determining whether a current use power of a charging circuit is within a maximum use power; and if the current use power of the charging circuit is within the maximum use power, allocating the device that enters the charging standby mode to the available socket.

Advantageous Effects of Disclosure

The battery charging management system and the battery charging management method according to an embodiment of the present disclosure may efficiently charge and manage a plurality of batteries in a limited power environment according to the charging strategy required by a user.

The battery charging management system and the battery charging management method may also charge and manage a large number of batteries in a situation where the large number of batteries are charged without intervention of human, thereby reducing the labor hired for charging.

The battery charging management system and the battery charging management method may also limit charging when a charging request exceeds the power load in charging a battery and prevent fire and accident that may occur in a supply network chain.

The effects of the present disclosure are not limited to the above-mentioned effects, and other effects not mentioned will be clearly understood by those skilled in the art from the following description.

DETAILED DESCRIPTION

The disclosure will now be described more fully with reference to the accompanying drawings, in which embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those of skill in the art. For clarity, portions that are not relevant to the description of the disclosure are omitted.

The terms used in the present specification are merely used to describe particular embodiments of the disclosure, and are not intended to limit the disclosure. An expression used in the singular encompasses the expression of the plural, unless it has a clearly different meaning in the context.

In the present specification, it is to be understood that the terms such as "including", "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

In addition, the components shown in the embodiments of the present disclosure are shown independently to represent different characteristic functions, and do not mean that each component includes separate hardware or one software unit. That is, each component is described by listing each component for convenience of description, and at least two of the components may be combined to form one component, or one component may be divided into a plurality of components to perform a function. The integrated and separated embodiments of each of these components are also included within the scope of the present disclosure without departing from the spirit of the disclosure.

In addition, embodiments below are provided so that this disclosure will be thorough and complete, and will fully convey the concept of the disclosure to those skilled in the art. In the drawings, sizes and thicknesses of components may be exaggerated for clarity.

Hereinafter, the disclosure will be described in detail with reference to the attached drawings.

Hereinafter, a device may be a device in which a battery pack is mounted to use electricity as a power source. For example, the device may be an electric mobility system such as a drone, an electric quick board, an electric bicycle, and an electric vehicle, or may be a device such as a laptop or a smartphone. The device may also be a battery pack onto which a battery management system (BMS) is mounted.

Figure 1:
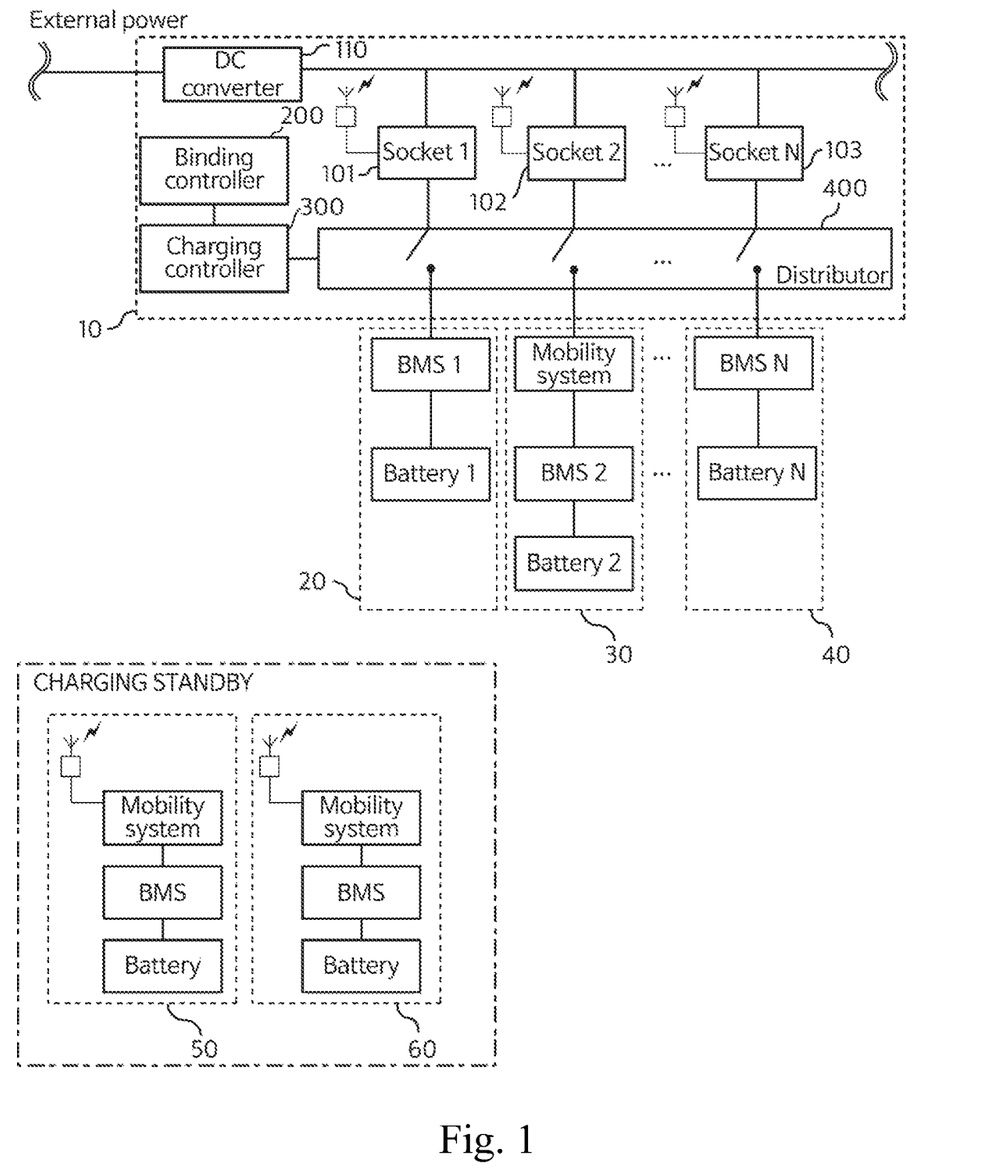
FIG. 1 is a block diagram of a battery charging management system according to an embodiment of the present disclosure.

FIG. 1 is a block diagram of a battery charging management system according to an embodiment of the present disclosure.

Referring to FIG. 1, a battery charging management system 10 according to an embodiment of the present disclosure may include a plurality of sockets 101, 102, and 103, a binding controller 200, a charging controller 300, and a distributor 400.

The battery charging management system 10 may be connected to an external power network to receive power from the outside. The battery charging management system 10 may supply the power supplied from the outside to devices 20, 30, and 40 through the plurality of sockets 101, 102, and 103 respectively. At this time, if the power supplied from the outside is AC, the battery charging management system 10 may further include a DC converter 110 for converting AC to DC. The plurality of sockets 101, 102, and 103 may be connected to the DC converter 110 to receive DC and supply a charging current to the devices 20, 30, and 40 respectively. Here, one DC converter 110 may be located in each socket.

The binding controller 200 may receive state information of a battery pack of the devices 20, 30, and 40 connected to the socket from a plurality of devices 20, 30, 40, 50, and 60 or may receive state information of a battery pack of the devices 50 and 60 that are waiting to be charged. The binding controller 200 may transmit the received state information to the charging controller 300.

Here, the state information of the battery pack may be information including one or more information among state of charge (SoC) information, state of health (SoH), current voltage information of the battery pack, charging current information of the battery pack, and discharge current information of the battery pack that are collected from the battery pack by a battery management system (BMS) mounted onto the battery pack. The SoH may be a ratio of the nominal capacity of the battery pack to the chargeable capacity of the current battery. The BMS is a circuit or a system for protecting and managing the battery pack and may manage the battery pack by collecting information such as the state information or learning the state information.

In addition, the binding controller 200 may determine the priority of the device to be allocated to the socket according to the charging strategy selected based on the state information.

The charging controller 300 may control charging of the battery pack of the device electrically connected to a charging circuit such that the battery pack is charged according to the priority. The charging of the battery pack of the device may be controlled by the charging controller 300 by controlling the distributor 400.

In addition, the charging controller 300 may control not only the charging strategy but also the distributor 400 to limit the charging power such that the charging power of the charging circuit does not exceed the maximum use power. For example, the sum of the amount of current charging power supplied by the charging circuit and the amount of charging power for a battery pack of a next order may exceed the maximum amount of power that may be supplied by the charging circuit. In this case, the charging controller 300 may control the distributor 400 for the safety of the battery charging management system 10, thereby blocking an electrical connection between the socket and the device onto which the battery pack of the next order are mounted, and thus charging may be deferred.

When the binding controller 200 determines the priority of the device to be allocated to the socket according to the charging strategy, the binding controller 200 may allocate one of the plurality of sockets 101, 102, and 103 to the device based on the state information of the battery pack mounted onto the device. The binding controller 200 may release allocation of the socket when the battery pack of the device is fully charged.

In addition, the binding controller 200 may generate a control signal such that the battery charging management system 10 generates a visual or audio signal when allocating the socket or releasing the allocation of the socket. For example, when the first socket 101 is allocated to the device 20, a screen and sound indicating allocation of the first socket 101 may be output from a display or a speaker of the battery charging management system 10.

In addition, the binding controller 200 may generate a control signal to allow an external automation system to bind the device to the socket when allocating the socket or releasing the allocation of the socket. Here, the external automation system may be a robot driven to physically bind or unbind the device to or from the socket. The control signal generated by the binding controller 200 may be a signal for controlling the external automation system.

The charging strategy may be selected by the user. The charging controller 300 may charge battery packs of the plurality of devices according to the charging strategy selected by the user. Here, the charging strategy, in an embodiment, may be a full charging priority charging strategy and a charging amount priority charging strategy. Detailed descriptions of the full charging priority charging strategy and the charging amount priority charging strategy will be given later.

The distributor 400 may control the electrical connection between the devices 20, 30, and 40 respectively connected to the sockets 101, 102, and 103 and the charging circuit under the control of the charging controller 300. The charging circuit may be a circuit that receives external power including the DC converter 110 and supplies charging power to the device. When the device is electrically connected with the charging circuit, the battery pack of the connected device may be charged. The distributor 400 may perform switching to close or open the electrical connection of the device connected to the charging circuit and the socket under the control of the charging controller 300.

Specifically, in an embodiment, when the charging power of the charging circuit is smaller than the maximum use power according to the charging strategy, the distributor 400 may switch the electrical connection such that the battery pack of the next order determined according to the full charging priority charging strategy among the battery packs of the devices 20, 30, and 40 respectively connected to the sockets 101, 102, and 103 may be charged.

Specifically, the distributor 400 may close a circuit for connecting the socket and the device onto which the battery pack of priority is mounted under the control of the charging controller 300 based on the charging strategy. In this case, the charging controller 300 may control the distributor 400 such that the simultaneous charging power of the plurality of devices does not exceed the maximum use power of the battery charging management system 10. The charging controller 300 may calculate the required power of the plurality of devices to select devices to be charged simultaneously, and control the distributor 400 such that only the selected devices are charged. The charging controller 300 may calculate whether the sum of the required power of the battery pack of the next order to be charged and the current charging power exceeds the maximum use power of the battery charging management system 10 when the device is fully charged, and if not, control the distributor 400 such that the battery pack of the next order is charged to close the circuit for connecting the socket and the device onto which the battery pack of the next order is mounted.

In addition, the distributor 400 may open the circuit with respect to the device onto which the fully charged battery pack is mounted to block the electrical connection such that the battery pack is no longer charged.

According to the present disclosure, the binding controller 200 and the charging controller 300 may obtain all the battery state information, thereby controlling the charging order and the charging method using charging strategies of various algorithms. Therefore, more efficient charging and management of the battery may be possible by deviating from a method of firstly charging a device preoccupying the conventional charger.

In an embodiment of the present disclosure, the binding controller 200 may receive the state information from the plurality of devices 20, 30, 40, 50, and 60 using a wireless communication module. In this case, the binding controller 200 may also receive the battery pack state information of the devices 50 and 60 that are not connected to the socket. The device side may transmit the state information using a wireless communication module mounted onto the device side.

In addition, the charging controller 300 may determine the priority according to the charging strategy for a device that enters a charging standby mode among the devices from which the binding controller 200 receives the state information. For example, even though there is a device that receives the state information, the charging controller 300 may exclude the device from determination of the priority and determine the priority if the device does not enter the charging standby mode.

Specifically, the charging controller 300 may determine the priority according to the charging strategy in consideration of the state information wirelessly received when the device that is not connected to the socket enters the charging standby mode. The binding controller 200 may allocate the device to each socket according to the determined priority.

Here, the device entering the charging standby mode may be the device transmitting a signal for requesting charging from the battery charging management system 10. At this time, the device may generate a charging request signal and transmit the charging request signal to the binding controller 200. When receiving the charging request signal of the device, the binding controller 200 may determine priority according to the charging strategy for the device.

In an embodiment, the device is an electric vehicle, and the battery charging management system 10 may be an electric vehicle charging station. When the electric vehicle enters an electric vehicle charging station zone, the electric vehicle may recognize the zone and transmit the charging request signal to the binding controller 200 of the electric vehicle charging station. The binding controller 200 may receive the charging request signal of the device and determine priority according to the charging strategy for the device. The binding controller 200 may allocate the socket to the electric vehicle when the electric vehicle is in the order of charging.

The binding controller 200 may generate a notification signal such that the device 50 for which the allocation of the socket is approved is recognized by the user when the socket is allocated or the allocation of the socket is released. The notification signal may be transmitted to the device 50 through a wireless communication module of the binding controller 200, and the device 50 receiving the notification signal may output a visual or audio signal for the user to recognize. For example, the visual or audio signal may be output by emitting light from an LED mounted onto the device 50 or repeatedly outputting a preset sound from a speaker mounted onto the device 50. The user may recognize the signal of the device 50 and bind the device 50 to a socket allocated to the device 50.

Here, wireless communication may include, for example, cellular communication or short range communication. For example, cellular communication may include at least one of 5G New Radio (NR), Long-term Evolution Machine Type Communication (LTE-M), Narrowband Internet of Things (NB-IoT), long-term evolution (LTE), LTE Advance (LTE-A), Code division multiple access (CDMA), wideband CDMA (WCDMA), universal mobile telecommunications system (UMTS), wireless broadband (WiBro), or Global System for Mobile Communications (GSM). Short range communication may include at least one of wireless fidelity (Wi-Fi), Bluetooth, or Near Field Communication (NFC). However, the present disclosure is not limited thereto, and wireless communication technology that will be developed later may be included.

Not only a device connected to a socket is charged according to the charging strategy, but even if they are not wired, the device may be charged properly according to the charging strategy. In addition, when wireless communication is used, even the information of a battery pack not mounted onto the socket may be known in advance, and thus a more efficient prediction may be possible in a process of charging a plurality of batteries. In addition, the battery pack need to be mounted onto the battery charging management system 10 may be selected in advance through the charging strategy.

Figure 2:
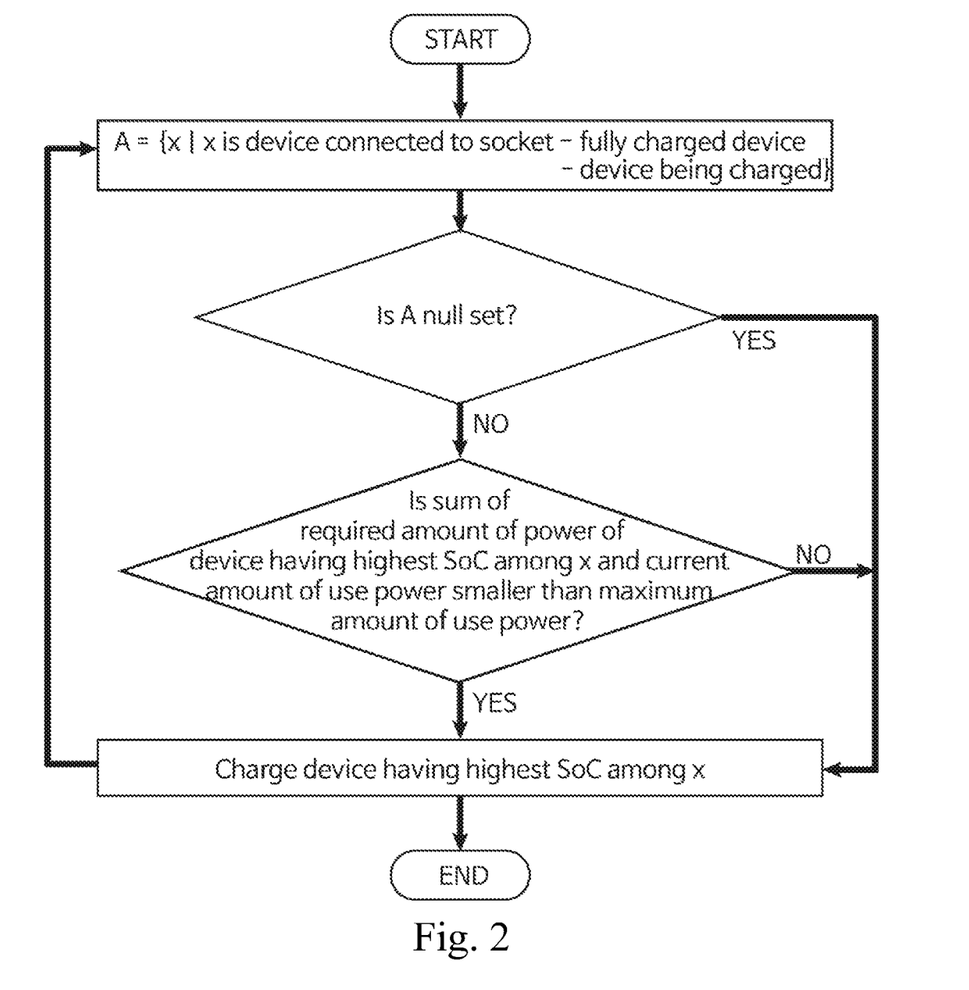
FIG. 2 is a diagram illustrating a full charging priority charging strategy algorithm according to an embodiment of the present disclosure.

FIG. 2 is a diagram illustrating a full charging priority charging strategy algorithm according to an embodiment of the present disclosure.

Referring to FIG. 2, a full charging priority charging strategy performed by the charging controller 300 may be a charging strategy that preferentially charges a device onto which a battery pack having the highest SoC is mounted such that a fully charged device may be obtained as soon as possible. In the above full charging priority charging strategy, the number of simultaneous chargeable devices may vary depending on the maximum amount of use power that the battery charging management system 10 may supply.

More specifically, with regard to the full charging priority charging strategy algorithm, the charging controller 300 identifies remaining devices except for a device that is fully charged and a device that is being charged among devices connected to the socket 101, 102, and 103 of the battery charging management system 10. If there are the remaining devices, the charging controller 300 identifies the device having the highest SoC of the battery pack among the remaining devices. In addition, the charging controller 300 may control the binding controller 200 or the distributor 400 such that the device having the highest SoC of the battery pack among the remaining devices may be preferentially charged if the sum of the required amount of power (e.g., the amount of power to be charged) of the battery pack having the highest SoC and the current amount of use power that the current battery charging management system 10 uses as charging is smaller than the available maximum amount of use power of the battery charging management system. Thereafter, the charging controller 300 repeatedly performs the above process until there is no remaining device or until the sum of the required amount of power of the battery pack and the current amount of use power is equal to or greater than the maximum amount of use power.

The full charging priority charging strategy may be suitable when the time available for charging is short. In addition, the full charging priority charging strategy has a high probability that a fixed voltage mode is activated, which reduces power consumption, and thus more devices may be simultaneously charged.

Figure 3:
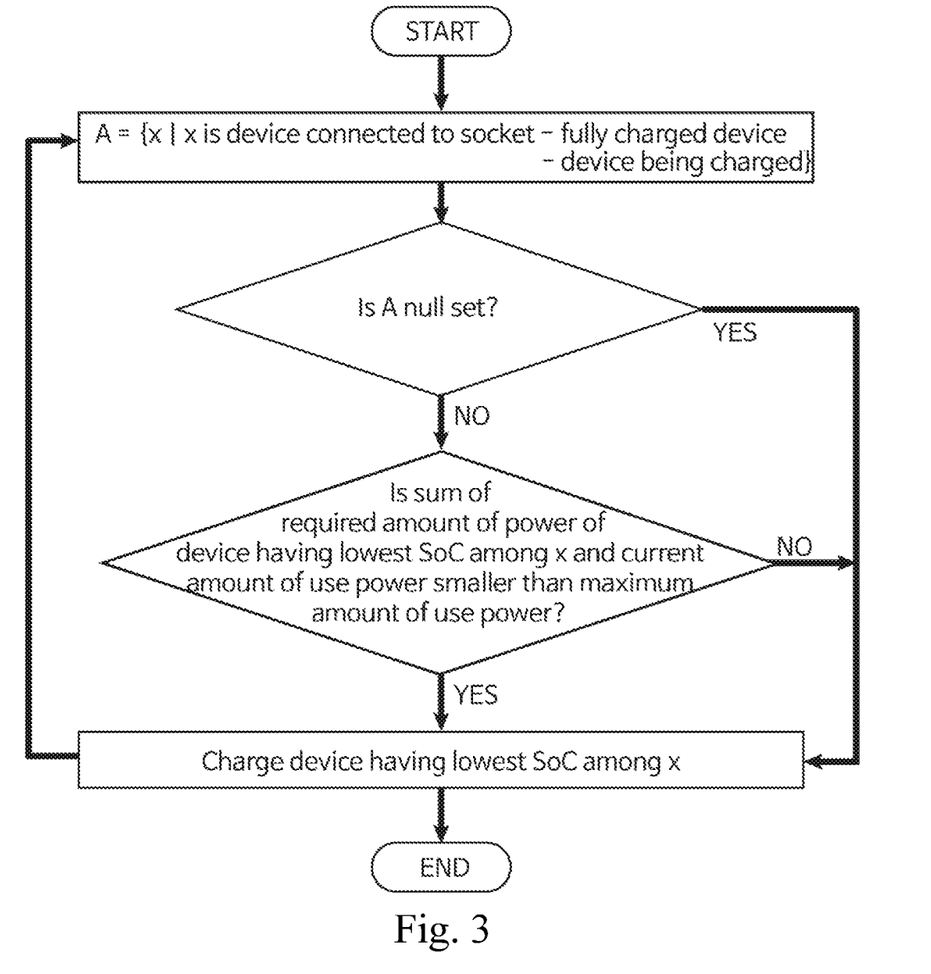
FIG. 3 is a diagram showing a charging amount priority charging strategy algorithm according to an embodiment of the present disclosure.

FIG. 3 is a diagram showing a charging amount priority charging strategy algorithm according to an embodiment of the present disclosure.

Referring to FIG. 3, a charging amount priority charging strategy performed by the charging controller 300 may be a charging strategy that preferentially charges a device onto which a battery pack having the lowest SoC is mounted such that the battery charging management system 10 may supply the available maximum power from the beginning of charging. The charging amount priority charging strategy may be a charging strategy such that a battery pack of a device being charged is fully charged as a whole.

More specifically, with regard to the charging amount priority charging strategy algorithm, the charging controller 300 identifies remaining devices except for a device that is fully charged and a device that is being charged among devices connected to the socket 101, 102, and 103 of the battery charging management system 10. If there are the remaining devices, the charging controller 300 identifies the device having the lowest SoC of the battery pack among the remaining devices. In addition, the charging controller 300 may control the binding controller 200 or the distributor 400 such that the device having the lowest SoC of the battery pack among the remaining devices may be preferentially charged if the sum of the required amount of power (e.g., the amount of power to be charged) of the battery pack having the lowest SoC and the current amount of use power that the current battery charging management system 10 uses as charging is smaller than the available maximum amount of use power of the battery charging management system. Thereafter, the charging controller 300 repeatedly performs the above process until there is no remaining device or until the sum of the required amount of power of the battery pack and the current amount of use power is equal to or greater than the maximum amount of use power.

The charging amount priority charging strategy may be suitable when the time available for charging is long. In addition, it is advantageous to charge in a fixed current mode where the most amount of power is supplied in the case of maximizing energy supplied to all of a plurality of battery sets. Therefore, the charging amount priority charging strategy may determine priority the battery pack having the lowest SoC with a high probability that the fixed voltage mode is activated.

Hereinafter, a battery charging management method using a battery charging management system will be described. In the detailed description of each step of the battery charging management method, the same description as that of the battery charging management system will be briefly mentioned.

Figure 4:
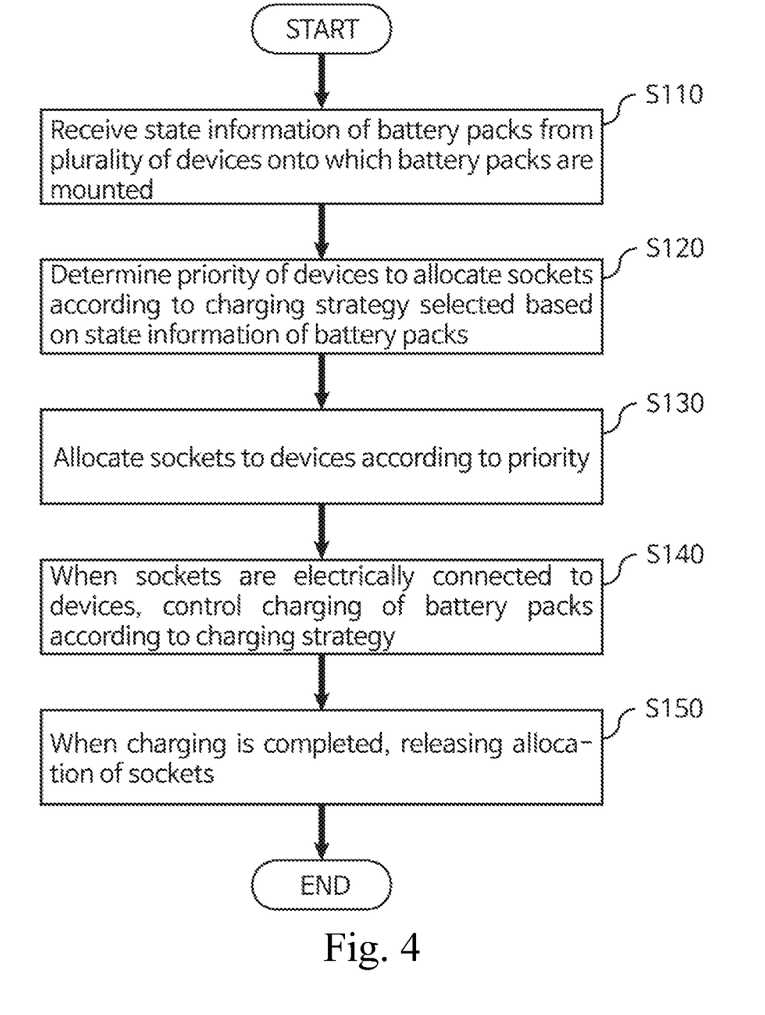
FIG. 4 is a flowchart of a battery charging management method according to an embodiment of the present disclosure.

FIG. 4 is a flowchart of a battery charging management method according to an embodiment of the present disclosure.

Referring to FIG. 4, the charging management method with regard to a plurality of battery packs performed by a computing device according to an embodiment of the present disclosure may include step (S110) of receiving state information of the battery packs from a plurality of devices onto which the battery packs are mounted, step (S120) of determining priority of the devices to allocate sockets according to a charging strategy selected based on the state information of the battery packs, step (S130) of allocating the sockets to the devices according to the priority, step (S140) of when the sockets are electrically connected to the devices, controlling charging of the battery packs according to the charging strategy, and step (S150) of when the charging is completed, releasing allocation of the sockets.

The computing device may include a central processing unit (CPU), an application processor (AP), and the like, and may internally include a memory capable of storing instructions or data related to at least one other component or communicate with an external memory if necessary to access necessary information.

The state information of the battery pack may include one or more information among state of charge (SoC) information, state of health (SoH), current voltage information of the battery pack, charging current information of the battery pack, and discharge current information of the battery pack that are collected from the battery pack by a battery management system (BMS) mounted onto the battery pack.

Here, the charging strategy may be a full charging priority charging strategy of charging the battery packs of the plurality of devices in ascending order of SoC values, or may be a charging amount priority charging strategy of charging the battery packs of the plurality of devices in descending order of SoC values.

Controlling the charging of the battery pack according to the charging strategy may be switching an electrical connection such that a battery pack of the next order is charged according to the charging strategy among the battery packs of the plurality of devices if the charging power of a charging circuit is smaller than the maximum use power.

In an embodiment, the state information may be received from the devices using a wireless communication module, and the priority may be determined for the battery packs of the devices that enter a charging standby mode.

Figure 5:
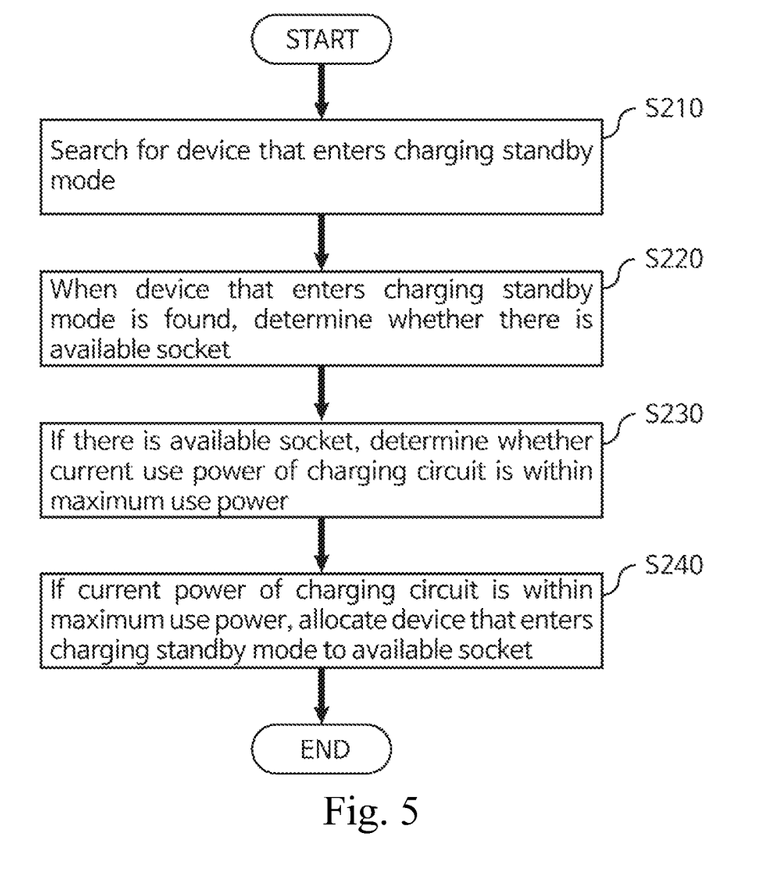
FIG. 5 is a flowchart of a battery charging management method according to an embodiment of the present disclosure.

FIG. 5 is a flowchart of a battery charging management method according to an embodiment of the present disclosure.

In an embodiment, the battery charging management method with respect to a plurality of battery packs performed by a computing device may include step (S210) of searching for a device that enters a charging standby mode, step (S220) of when the device that enters the charging standby mode is found, determining whether there is an available socket, step (S230) of if there is the available socket, determining whether the current use power of a charging circuit is within the maximum use power and step (S240) of if the current power of the charging circuit is within the maximum use power, allocating the device that enters the charging standby mode to the available socket.

Here, allocation of the socket and releasing of the allocation of the socket may be performed in connection with another external system to automatically perform the physical binding between the socket and the device. In addition, searching for the device that enters the charging standby mode may be performed using wired or wireless communication.

Various embodiments described herein may be implemented by hardware, middleware, microcode, software, and/or combinations thereof. For example, various embodiments may include one or more application specific semiconductors (ASICs), digital signal processors (DSPs), digital signal processing devices (DSPDs), programmable logic devices (PLDs), field programmable gate arrays (FPGAs), processors, controllers, microcontrollers, microprocessors, other electronic units designed to perform the functions presented herein, or a combination thereof.

Also, for example, various embodiments may be embedded in or encoded on a computer-readable medium containing instructions. Instructions embedded in or encoded on a computer-readable medium may cause a programmable processor or other processor to perform a method, for example, when the instructions are executed. Computer-readable media include both computer storage media and communication media including any medium that facilitates transfer of a computer program from one place to another. The storage medium may be any available medium that can be accessed by a computer. For example, such computer-readable media may include RAM, ROM, EEPROM, CD-ROM, or other optical disk storage media, magnetic disk storage media or other magnetic storage devices, or any other medium that may be used to convey or store the desired program code in the form of instructions or data structures accessible by a computer.

Such hardware, software, firmware, etc. may be implemented within the same device or within separate devices to support the various operations and functions described herein. In addition, the components, units, modules, components, etc., described herein as "unit" may be implemented separately or separately as discrete but interoperable logic devices. The depiction of different features for modules, units, etc. is intended to highlight different functional embodiments and does not necessarily mean that they must be realized by individual hardware or software components. Rather, functionality associated with one or more modules or units may be performed by separate hardware or software components or integrated into common or separate hardware or software components.

Although the operations are shown in the drawings in a specific order, it should not be understood that these operations are performed in the specific order shown, or sequential order, to achieve the desired result, or that all illustrated operations need to be performed. In some circumstances, multitasking and parallel processing may be advantageous. Moreover, the division of various components in the above-described embodiments should not be understood as requiring such division in all embodiments, and it should be understood that the described components may be generally integrated together into a single software product or packaged into multiple software products.

Although the present disclosure has been described with reference to the embodiment shown in the drawings, this is merely exemplary and will be understood by those of ordinary skill in the art that various modifications and equivalent other embodiments are possible. Therefore, the true technical protection scope of the present disclosure will be defined by the technical sprit of the appended claims.

What is claimed is:

1. A battery charging management system with respect to a plurality of battery packs, the battery charging management system comprising:
a plurality of sockets combinable with a plurality of devices onto which the plurality of battery packs are mounted;
a binding controller configured to receive state information of the plurality of battery packs from the plurality of devices onto which the plurality of battery packs are mounted, determine a priority of the plurality of devices to be allocated to the plurality of sockets according to a charging strategy selected based on the state information, and allocate one of the plurality of sockets to one of the plurality of devices or release the allocating;
a charging controller configured to control charging of the plurality of battery packs of the plurality of devices electrically connected to a charging circuit based on the state information received by the binding controller; and
a distributor configured to switch an electrical connection between the charging circuit and the plurality of battery packs of the plurality of devices under control of the charging controller, wherein the binding controller is configured to generate a control signal such that the battery charging management system generates a visual or audio signal, or to generate a control signal for controlling a robot that binds the plurality of devices to the plurality of sockets, in response to allocating the plurality of sockets or releasing the allocating.

2. The battery charging management system of claim 1, wherein the charging strategy is to charge the plurality of battery packs of the plurality of devices in descending order of state of charge (SoC) values.

3. The battery charging management system of claim 2, wherein the distributor is configured to switch an electrical connection such that a battery pack of a next order is charged according to the charging strategy among the plurality of battery packs of the plurality of devices if a charging power of a charging circuit is smaller than a maximum use power.

4. The battery charging management system of claim 1, wherein the charging strategy is to charge the plurality of battery packs of the plurality of devices in ascending order of SoC values.

5. The battery charging management system of claim 4, wherein the distributor is configured to switch an electrical connection such that a battery pack of a next order is charged according to the charging strategy among the plurality of battery packs of the plurality of devices if a charging power of a charging circuit is smaller than a maximum use power.

6. The battery charging management system of claim 1, wherein the state information of the plurality of battery packs comprises one or more pieces of information among state of charge (SoC) information, state of health (SoH) information, current voltage information of the plurality of battery packs, charging current information of the plurality of battery packs, and discharge current information of the plurality of battery packs, which are collected from the plurality of battery packs by a battery management system (BMS) mounted onto the plurality of battery packs.

7. The battery charging management system of claim 6, wherein the binding controller is configured to receive the state information from the plurality of devices using a wireless communication module.

8. The battery charging management system of claim 7, wherein the binding controller is configured to determine the priority for a device that enters a charging standby mode among the plurality of devices.

9. The battery charging management system of claim 8, wherein if there are sockets that are not connected to the plurality of devices among the plurality of sockets, and a current use power of the charging circuit is within a maximum use power, the binding controller is configured to allocate one of the sockets that are not connected to the plurality of devices to the device that enters the charging standby mode.

10. The battery charging management system of claim 1, wherein the charging controller is configured to limit a charging power of the charging circuit such that the charging power of the charging circuit does not exceed a maximum use power.

11. The battery charging management system of claim 1, wherein the plurality of devices having one of the plurality of battery packs onto which a BMS is mounted are unmanned aerial vehicles (UAVs), and electrically driven mobilities.

12. A battery charging management method performed by a computing device with respect to a plurality of battery packs, the battery charging management method comprising:
receiving state information of a plurality of battery packs from a plurality of devices onto which the plurality of battery packs are mounted;
determining a priority of the plurality of devices to allocate the plurality of sockets according to a charging strategy selected based on the state information;
allocating the plurality of sockets to the plurality of devices according to the priority;
generating a control signal such that the computing device generates a visual or audio signal, or generating a control signal for controlling a robot that binds the plurality of devices to the plurality of sockets, in response to allocating the plurality of sockets or releasing the allocating;
controlling charging of the plurality of battery packs according to the charging strategy if the plurality of sockets are electrically connected to the plurality of devices; and
releasing the allocating of the plurality of sockets if the charging is completed.

13. The battery charging management method of claim 12, wherein the charging strategy charges the plurality of battery packs of the plurality of devices in ascending order of state of charge (SoC) values.

14. The battery charging management method of claim 13, wherein an electrical connection is switched such that a battery pack of a next order is charged according to the charging strategy among the plurality of battery packs of the plurality of devices if a charging power of a charging circuit is smaller than maximum use power.

15. The battery charging management method of claim 12, wherein the charging strategy charges the plurality of battery packs of the plurality of devices in descending order of SoC values.

16. The battery charging management method of claim 15, wherein an electrical connection is switched such that a battery pack of a next order is charged according to the charging strategy among the plurality of battery packs of the plurality of devices if a charging power of a charging circuit is smaller than a maximum use power.

17. The battery charging management method of claim 12, wherein the state information of the plurality of battery packs comprises one or more information among state of charge (SoC) information, state of health (SoH), current voltage information of the plurality of battery packs, charging current information of the plurality of battery packs, and discharge current information of the plurality of battery packs that are collected from the plurality of battery packs by a battery management system (BMS) mounted onto the plurality of battery packs.

18. The battery charging management method of claim 16, wherein the state information is received from the plurality of devices using a wireless communication module, and wherein the priority is determined for a device that enters a charging standby mode among the plurality of devices.

19. A battery charging management method performed by a computing device with respect to a plurality of battery packs, the battery charging management method comprising:
- searching for a device that enters a charging standby mode;
- generating a control signal such that the computing device generates a visual or audio signal, or generating a control signal for controlling a robot that binds a plurality of devices to a plurality of sockets, in response to allocating the plurality of sockets or releasing the allocating;
- if the device that enters the charging standby mode is found, determining whether there is an available socket;
- if there is the available socket, determining whether a current use power of a charging circuit is within a maximum use power; and
- if the current use power of the charging circuit is within the maximum use power, allocating the device that enters the charging standby mode to the available socket.

* * * * *